(12) United States Patent
Miao et al.

(10) Patent No.: US 10,539,744 B2
(45) Date of Patent: Jan. 21, 2020

(54) GAPLESS OPTICAL MODE CONVERTER

(71) Applicant: Futurewei Technologies, Inc., Plano, TX (US)

(72) Inventors: Rongsheng Miao, San Jose, CA (US); Zongrong Liu, Pleasanton, CA (US); Xueyan Zheng, Andover, MD (US); Xiao Shen, San Bruno, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/403,736

(22) Filed: Jan. 11, 2017

(65) Prior Publication Data

US 2017/0205582 A1     Jul. 20, 2017

Related U.S. Application Data

(60) Provisional application No. 62/278,518, filed on Jan. 14, 2016.

(51) Int. Cl.
  *G02B 6/30*   (2006.01)
  *G02B 6/14*   (2006.01)
  *G02B 6/32*   (2006.01)
  *G02B 6/36*   (2006.01)

(52) U.S. Cl.
  CPC .......... *G02B 6/30* (2013.01); *G02B 6/14* (2013.01); *G02B 6/32* (2013.01); *G02B 6/3636* (2013.01)

(58) Field of Classification Search
  CPC ................................. G02B 6/30; G02B 6/14
  USPC ........................................................... 385/28
  See application file for complete search history.

(56) References Cited

U.S. PATENT DOCUMENTS

| | | | | |
|---|---|---|---|---|
| 5,155,785 A | * | 10/1992 | Holland | G02B 6/3608 156/158 |
| 5,384,874 A | * | 1/1995 | Hirai | G02B 3/0087 385/11 |
| 6,168,319 B1 | * | 1/2001 | Francis | G02B 6/2937 385/55 |
| 6,253,006 B1 | * | 6/2001 | Heimer | G02B 3/0056 385/33 |
| 6,910,812 B2 | * | 6/2005 | Pommer | G02B 6/4201 257/200 |
| 7,653,274 B2 | * | 1/2010 | Ayliffe | G02B 6/4204 385/33 |
| 8,989,229 B2 | * | 3/2015 | Oh | H01S 5/026 372/50.1 |

(Continued)

FOREIGN PATENT DOCUMENTS

| | | |
|---|---|---|
| CN | 101533128 A | 9/2009 |
| WO | 2004077629 A1 | 9/2004 |

OTHER PUBLICATIONS

Machine Translation and Abstract of Chinese Publication No. CN101533128, Sep. 16, 2009, 9 pages.

(Continued)

*Primary Examiner* — Kaveh C Kianni
(74) *Attorney, Agent, or Firm* — Conley Rose, P.C.

(57) ABSTRACT

A gapless optical mode converter comprising a fiber holder configured to receive and hold an optical transmission line, a first glass block coupled via an optical adhesive at a first side to the fiber holder, a lens coupled via the optical adhesive at a first side to a second side of the first glass block, and a holder configured to hold the fiber holder, the first glass block, and the lens.

8 Claims, 5 Drawing Sheets

(56) References Cited

U.S. PATENT DOCUMENTS

| | | | |
|---|---|---|---|
| 9,529,155 B2* | 12/2016 | Bhagavatula | G02B 6/32 |
| 9,784,920 B2* | 10/2017 | Anderson | G02B 6/32 |
| 2002/0057873 A1* | 5/2002 | Wu | G02B 6/262 |
| | | | 385/33 |
| 2002/0106155 A1* | 8/2002 | Brun | G02B 6/2937 |
| | | | 385/34 |
| 2002/0110328 A1* | 8/2002 | Bischel | G02B 6/4201 |
| | | | 385/49 |
| 2002/0131699 A1 | 9/2002 | Raguin et al. | |
| 2002/0131700 A1* | 9/2002 | Nakama | G02B 6/32 |
| | | | 385/33 |
| 2003/0063832 A1* | 4/2003 | Hellman | G02B 6/2706 |
| | | | 385/11 |
| 2003/0123498 A1* | 7/2003 | Ishino | G02B 6/305 |
| | | | 372/21 |
| 2003/0179975 A1* | 9/2003 | Bures | G02F 1/116 |
| | | | 385/7 |
| 2004/0052475 A1 | 3/2004 | Deng et al. | |
| 2004/0165822 A1* | 8/2004 | Kobayashi | G02B 6/32 |
| | | | 385/33 |
| 2004/0170353 A1* | 9/2004 | Kobayashi | G02B 6/32 |
| | | | 385/33 |
| 2004/0218870 A1* | 11/2004 | Blauvelt | G02B 6/2746 |
| | | | 385/50 |
| 2006/0239605 A1* | 10/2006 | Palen | G02B 6/4206 |
| | | | 385/14 |
| 2010/0006784 A1* | 1/2010 | Mack | G02B 6/34 |
| | | | 250/551 |
| 2011/0182082 A1* | 7/2011 | Ide | G02B 6/421 |
| | | | 362/553 |
| 2013/0114924 A1* | 5/2013 | Loh | G02B 6/1245 |
| | | | 385/14 |
| 2013/0279860 A1* | 10/2013 | Hung | G02B 6/43 |
| | | | 385/89 |
| 2014/0166881 A1* | 6/2014 | Han | G01N 21/3581 |
| | | | 250/338.1 |
| 2015/0050019 A1* | 2/2015 | Sengupta | H04J 14/04 |
| | | | 398/44 |
| 2015/0260931 A1* | 9/2015 | Miao | G02B 7/02 |
| | | | 29/600 |
| 2016/0013870 A1* | 1/2016 | Sorin | G02B 6/4208 |
| | | | 398/208 |
| 2016/0062039 A1* | 3/2016 | Zhang | G02B 6/305 |
| | | | 385/14 |
| 2016/0337727 A1* | 11/2016 | Graves | H04Q 11/0005 |
| 2017/0160490 A1* | 6/2017 | Zhang | G02B 6/3846 |
| 2017/0176685 A1* | 6/2017 | Ishihara | G02B 6/305 |

OTHER PUBLICATIONS

Foreign Communication From a Counterpart Application, PCT Application No. PCT/CN2017/071170, English Translation of International Search Report dated Nov. 6, 2017, 8 pages.

Foreign Communication From a Counterpart Application, PCT Application No. PCT/CN2017/071170, English Translation of Written Opinion dated Nov. 6, 2017, 4 pages.

* cited by examiner

GAPLESS OPTICAL MODE CONVERTER

CROSS-REFERENCE TO RELATED APPLICATIONS

The present application claims priority to U.S. Provisional Patent Application No. 62/278,518 filed Jan. 14, 2016 by Rongsheng Miao, et al. and entitled "Gapless Optical Mode Converter," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

An optical mode converter performs mode conversion to manipulate a size of an optical signal. For example, a silicon-on-insulator (SOI) waveguide input/output port may a have a size of about 2-4 micrometers (um) and a single mode fiber coupling light to the SOI waveguide may have a size of about 8-9 um. An optical mode converter may couple the single mode fiber to the SOI waveguide to provide mode conversion (size conversion). The optical mode converter may be an open path (e.g., include an air gap) such that the optical mode converter is packaged in a hermetically sealed package to provide suitable performance of the optical mode converter, which may increase a complexity and cost of production of the optical mode converter.

SUMMARY

In an embodiment, the disclosure includes a gapless optical mode converter comprising a fiber holder configured to receive and hold an optical transmission line, a first glass block coupled via an optical adhesive at a first side to the fiber holder, a lens coupled via the optical adhesive at a first side to a second side of the first glass block, and a holder configured to hold the fiber holder, the first glass block, and the lens.

In an embodiment, the gapless optical mode converter further comprises a second glass block coupled at a first side to a second side of the lens, wherein the holder is further configured to hold the second glass block, wherein at least one of the first glass block and the second glass block comprises a borosilicate glass, wherein the borosilicate glass is a crown glass, wherein the fiber holder comprises an upper portion and a lower portion, wherein the upper portion and the lower portion each comprise a groove, and wherein the upper portion and the lower portion together are configured to receive and hold the optical transmission line via the groove, wherein the optical adhesive is an epoxy resin, wherein the gapless optical mode converter further comprises a cover configured to at least partially cover the fiber holder, the first glass block, and the lens, wherein the lens is a silicon lens, and wherein the lens is configured to reduce a mode of an optical light passed to the lens from the optical transmission line via the first glass block.

In an embodiment, the disclosure includes a transmitter optical sub-assembly (TOSA) comprising a substrate, a SOI waveguide coupled to the substrate, and a gapless optical mode converter coupled via an optical adhesive to the SOI waveguide and comprising a fiber holder configured to receive and hold an optical transmission line, a first glass block coupled via the optical adhesive at a first side to the fiber holder, and a lens coupled via the optical adhesive at a first side to a second side of the first glass block.

In an embodiment, the gapless optical mode converter further comprises a second glass block coupled at a first side to a second side of the lens, wherein the gapless optical mode converter further comprises a holder configured to hold at least some of the fiber holder, the first glass block, the lens, and the second glass block, wherein the first glass block is a borosilicate glass, wherein the gapless optical mode converter further comprises a cover configured to cover at least a portion of the gapless optical mode converter, wherein the optical adhesive is an epoxy resin, wherein a position of the gapless optical mode converter with respect to the SOI waveguide is determines according to an active alignment of the gapless optical mode converter.

In an embodiment, the disclosure includes a method of manufacturing a gapless optical mode converter, comprising coupling a fiber holder to a first glass block via an optical adhesive, coupling the first glass block to a lens via the optical adhesive, and coupling the fiber holder, the first glass block, and the lens to a bottom holder via the optical adhesive.

In an embodiment, the method further comprises coupling an upper portion of the fiber holder to a lower portion of the fiber holder via the optical adhesive to hold an optical transmission line within the fiber holder, coupling a second glass block to the lens via the optical adhesive, coupling a cover to the gapless optical mode converter via the optical adhesive, performing an active alignment of the gapless optical mode converter with a waveguide, and coupling the gapless optical mode converter to the waveguide via the optical adhesive.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are embodiments that provide for a gapless optical mode converter. The gapless optical mode converter enables mode conversion of an optical light without the use of free space (e.g., an open air area through which the optical light passes during a process of optical mode conversion). Additionally, the gapless nature of the gapless optical mode converter enables packing of the gapless optical mode converter in non-hermetically sealed packaging. The gapless optical mode converter comprises a glass block coupled to a silicon lens. Optionally, the gapless optical mode converter further comprises a second glass block coupled to the silicon lens such that the silicon lens is abutted on at least two sides (e.g., two opposing sides) by glass blocks.

Figure 1:
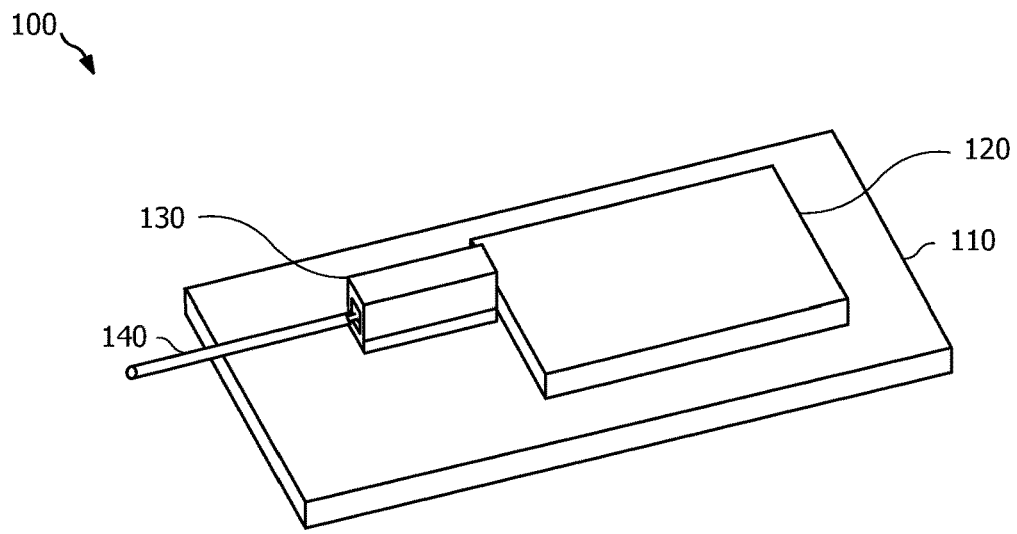
FIG. 1 is a block diagram of an embodiment of a TOSA implementing a gapless optical mode converter.

Referring now to FIG. 1, a block diagram of an embodiment of a transmitter optical sub-assembly (TOSA) 100 implementing a gapless optical mode converter is shown. The TOSA 100 includes a substrate 110, a SOI waveguide 120, and a gapless optical mode converter 130. The TOSA 100 is further configured to receive an optical transmission line 140 (e.g., a fiber optic line) for communication of optical light to and/or from the TOSA 100. The TOSA 100 is, in some embodiments, configured to function as an optical transceiver to facilitate transmission and/or reception of optical light (e.g., optical wavelengths suitable for modulation with data and/or optical carriers modulated with data). The SOI waveguide 120 is coupled to the substrate 110, for example, via an adhesive substance, to maintain the SOI waveguide 120 in a stationary position. The SOI waveguide 120, in some embodiments, guides or routes electromagnetic waves exiting in an optical light through the SOI waveguide 120. For example, the SOI waveguide 120 guides electromagnetic waves in an optical light received from the optical transmission line 140 (as received from the gapless optical mode converter 130 after mode conversion to reduce a mode size of the optical light exiting the optical transmission line 140) from a first side of the SOI waveguide 120 to a second side of the SOI waveguide 120 to, for example, provide the optical light to one or more additional components for further processing.

The gapless optical mode converter 130 is arranged to be proximate to the first side of the SOI waveguide 120 (e.g., to abut the first side of the SOI waveguide 120 or be near the first side of the SOI waveguide 120 but with a gap between the gapless optical mode converter 130 and the first side of the SOI waveguide 120) to pass the optical light received from the optical transmission line 140 to the SOI waveguide 120. Prior to passing the optical light received from the optical transmission line 140 to the SOI waveguide 120, the gapless optical mode converter 130 is configured to convert a mode of the optical light. Converting the mode of the optical light, in some embodiments, comprises converting a mode size of the optical light from a first size to a second size. In some embodiments the first size is larger than the second size, while in other embodiments the first size is smaller than the second size. The gapless optical mode converter 130 is, in some embodiments, bi-directional (e.g., such that the gapless optical mode converter 130 reduces mode size as optical light passes through the gapless optical mode converter 130 in one direction and increases mode size as optical light passes through the gapless optical mode converter 130 in an opposite direction). In other embodiments, the gapless optical mode converter 130 is unidirectional such that the gapless optical mode converter 130 provides only one of reducing or increasing mode size as optical light passes through the gapless optical mode converter 130.

The gapless optical mode converter 130 is coupled to the substrate, for example, via an adhesive substance, to maintain the gapless optical mode converter 130 in a stationary position. Coupling the gapless optical mode converter 130 to the substrate 110, in some embodiments, provides for increased performance over a gapless optical mode converter that is not coupled to a substrate by increasing a mechanical and optical stability (e.g., such that the gapless optical mode converter 130 maintains an alignment with the SOI waveguide 120) when compared to the gapless optical mode converter that is not coupled to the substrate. Prior to coupling the gapless optical mode converter 130 to the substrate 110, the gapless optical mode converter 130 is aligned to the SOI waveguide 120 to enable optical light to pass from the gapless optical mode converter 130 to the SOI waveguide 120. The alignment is, in some embodiments, an active alignment. For example, an optical light is transmitted through the optical transmission line 140 for mode conversion by the gapless optical mode converter 130 and a position of the gapless optical mode converter 130 with respect to SOI waveguide 120 is adjusted (e.g., toward and/or away from the first side of the SOI waveguide 120 and/or laterally along the first side of the SOI waveguide 120). A response of the SOI waveguide 120 to the optical light received from the gapless optical mode converter 130 may be measured and when the response of the SOI waveguide 120 meets a predetermined threshold, the gapless optical mode converter 130 may be coupled to the substrate 110 at that position. The gapless optical mode converter 130 is, in some embodiments, coupled to the SOI waveguide 120 via an optical adhesive. For example, after the active alignment, an optical adhesive is placed between the gapless optical mode converter 130 and the SOI waveguide 120 when the active alignment results in a gap between the gapless optical mode converter 130 and the SOI waveguide 120. The optical adhesive is, in some embodiments, an optically transparent material such as an epoxy resin (which is sometimes referred to as a polyepoxide), while in other embodiments the optical adhesive is any adhesive substance that has no or minimal effect on optical light passing through the optical adhesive. Coupling the gapless optical mode converter 130 to the SOI waveguide 120 using an optical adhesive, in some embodiments, enables the TOSA 100 to be packaged in a non-hermetic packaging, thereby reducing a cost and/or complexity of creation of some embodiments of the TOSA 100.

Figure 2:
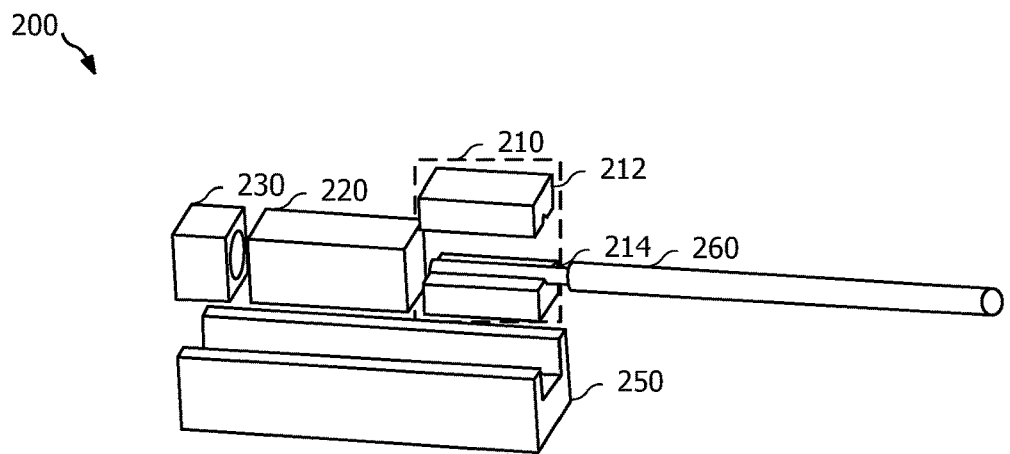
FIG. 2 is a block diagram of an exploded view of an embodiment of the first gapless optical mode converter.
Figure 3:
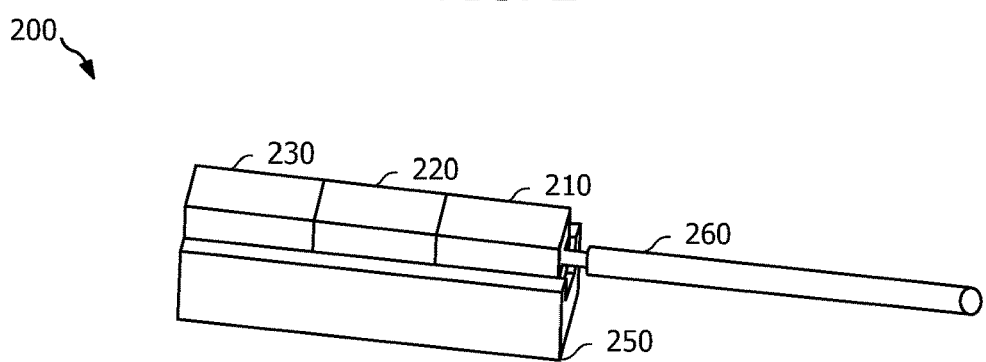
FIG. 3 is a block diagram of a perspective view of an embodiment of a first gapless optical mode converter.

Referring now to FIGS. 2 and 3, an exploded view of an embodiment of a first gapless optical mode converter 200 and a perspective view of an embodiment of the first gapless optical mode converter 200, respectively, are shown. The first gapless optical mode converter 200, in some embodiments, is suitable for implementation as the gapless optical mode converter 130 shown in FIG. 1. The first gapless optical mode converter 200 comprises a fiber holder 210, a first glass block 220, a lens 230, a bottom holder 250, and a cover (not shown). The fiber holder 210 includes an upper portion 212 and a lower portion 214. The upper portion 212 and the lower portion 214 are configured to couple together (e.g., through use of an optical adhesive coupling at least one face of the upper portion 212 to at least one face of the lower portion 214) to receive and securely hold an optical transmission line 260 (e.g., the optical transmission line 140 discussed above). The upper portion 212 and the lower portion 214, in some embodiments, each comprise a groove configured to receive the optical transmission line 260. The groove may be a v-groove, a u-shaped groove, or any other suitably shaped groove that enables the upper portion 212 and the lower portion 214 to receive and securely hold the optical transmission line 260. The groove of each of the upper portion 212 and the lower portion 214 may be substantially a same shape and/or size, may be a different shape and/or size, or only one of the upper portion 212 or the lower portion 214 may comprise the groove.

The fiber holder 210 is coupled to a first side of the first glass block 220, for example, through use of an optical adhesive, such that optical light carried by an optical transmission line 260 held by the fiber holder 210 may pass through the first glass block 220. The first glass block 220 is configured to form a path for the optical light to pass from the optical transmission line 260 to the lens 230. In some embodiments, a length of the first glass block 220 is less than about 20 millimeters (mm), less than about 10 mm, or less than about 5 mm, and particular dimensions of the first glass block 220 is not limited herein. Additionally, a particular width of the first glass block 220 may be a matter of design choice which is not limited herein. The first glass block 220 comprises a glass or other substantially clear or light-transmissive material that has a low refractive index to enable the optical light to pass through the first glass block 220 from the optical transmission line 260 to the lens 230 with minimal or no effect on the optical light (e.g., the first glass block 220 comprises a material that has a low refractive index and/or low dispersion). For example, in various embodiments the first glass block 220 may comprise crown glass, borosilicate glass, or any other suitable glass or non-glass material that enables the optical light to pass through the first glass block 220 from the optical transmission line 260 to the lens 230 with minimal or no effect on optical light.

A second side of the first glass block 220 is coupled to a first side of the lens 230, for example, through use of an optical adhesive. The lens 230 is configured to manipulate an optical light passing through the lens (e.g., an optical light carried by the optical transmission line 260 and passed through the first glass block 220 to the lens 230). For example, the lens 230 manipulates the optical light by converting a mode of the optical light (e.g., increasing or reducing a size of the mode of the optical light) as the optical light passes through the lens 230. A second side of the lens 230, in some embodiments, forms an outward facing side of the first gapless optical mode converter 200 and is configured to pass the manipulated optical light to a device adjacent to the lens 230 and the first gapless optical mode converter 200 (e.g., such as the SOI waveguide 120, discussed above). In some embodiments, the second side of the lens 230 is flush with face of the bottom holder 250, while in other embodiments the second side of the lens 230 protrudes outward from the first gapless optical mode converter 200 beyond the face of the bottom holder 250. The lens 230 is, in some embodiments, a silicon lens, while in other embodiments the lens 230 is any suitable material that is capable of manipulating an optical light passing through the lens 230 in a desired manner. A size of the lens 230 (e.g., at least one of a length and a width of the lens 230) is determined, in some embodiments, according to a desired amount of manipulation of the optical light by the lens 230 (e.g., an amount of reduction or increase in mode). In other embodiments, the size of the lens 230 may be independent of a function of the lens 230. The lens 230 may be, for example, less than about 20 mm, less than about 10 mm, or less than about 5 mm, and particular dimensions of the lens 230 are not limited herein. In addition, a size of the lens 230 may be based, at least in part, on a size of the first glass block 220 (e.g., such that the lens 230 is about ¾, about ½, about ¼, or any other suitable fraction or ratio of the size of the first glass block 220).

The bottom holder 250 is configured to receive and support the fiber holder 210, the first glass block 220, and the lens 230. The bottom holder 250 comprises, in some embodiments, a glass substance. For example, the bottom holder 250 may comprise crown glass, borosilicate glass, or any other suitable glass or non-glass material and may be a same glass material as the first glass block 220 or a different glass material than the first glass block 220. In some embodiments, the bottom holder 250 is a u-shaped channel having a width sufficient to receive the fiber holder 210, the first glass block 220, and the lens 230 without allowing lateral movement of the fiber holder 210, the first glass block 220, and the lens 230 between walls of the channel of the bottom holder 250. As such, particular dimensions of the bottom holder 250 are not limited herein, but nay be a matter of design choice based on a desired overall size of the first gapless optical mode converter 200 and a size of the fiber holder 210, the first glass block 220, and/or the lens 230. The bottom holder 250 is coupled to any one or more of the fiber holder 210, the first glass block 220, and the lens 230, for example, through use of an optical adhesive such that the fiber holder 210, the first glass block 220, and the lens 230 are securely held in place within the bottom holder 250 such that the bottom holder 250 increases a mechanical stability and/or strength of the first gapless optical mode converter 200.

Figure 4:
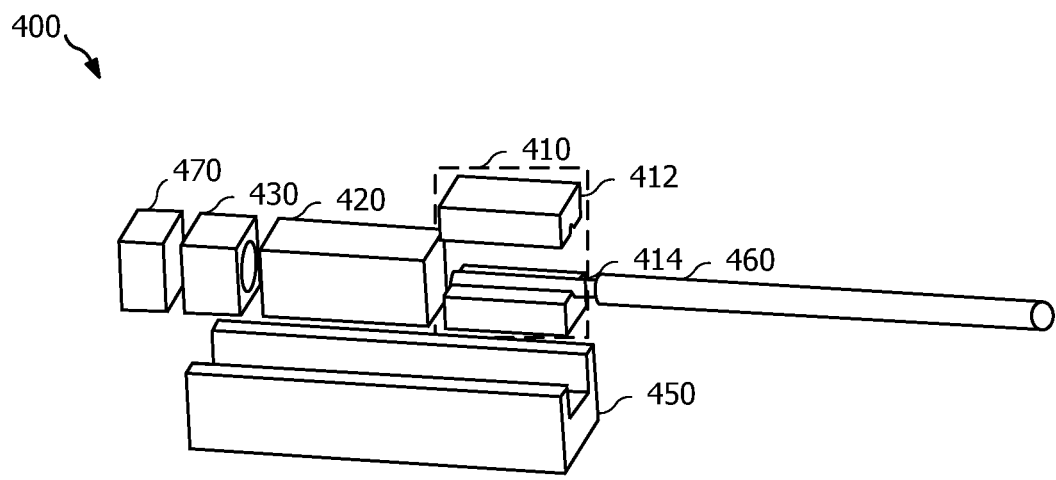
FIG. 4 is a block diagram of an exploded view of an embodiment of the second gapless optical mode converter.
Figure 5:
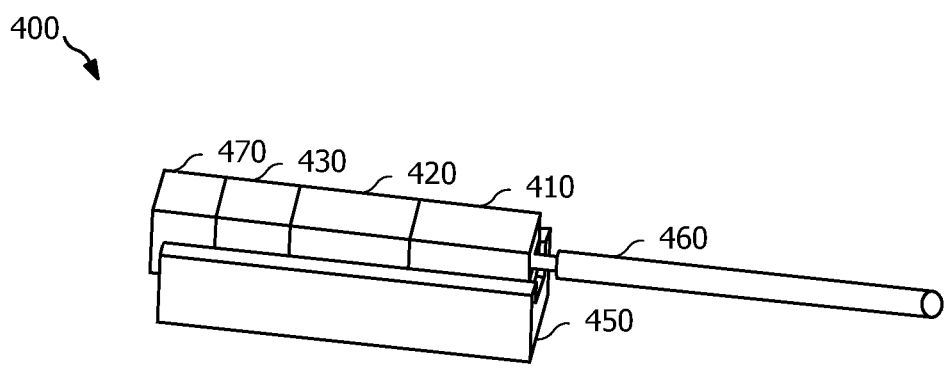
FIG. 5 is a block diagram of a perspective view of an embodiment of a second gapless optical mode converter.

Referring now to FIGS. 4 and 5, an exploded view of an embodiment of a second gapless optical mode converter 400 and a perspective view of an embodiment of the second gapless optical mode converter 400, respectively, are shown. The second gapless optical mode converter 400, in some embodiments, is suitable for implementation as the gapless optical mode converter 130 shown in FIG. 1. The second gapless optical mode converter 400 comprises a fiber holder 410 (including upper portion 412 and lower portion 414) configured to receive and securely hold an optical transmission line 460, a first glass block 420, a lens 430, a bottom holder 450, and a cover (not shown), each of which may be substantially similar to the fiber holder 210 (and corresponding upper portion 212 and lower portion 414), first glass block 220, lens 230, and bottom holder 250, respectively, descriptions for which are not repeated herein. The second gapless optical mode converter 400 further comprises a second glass block 470. A first side of the second glass block 470 is coupled to the second side of the lens 430, for example, through use of an optical adhesive.

A second side of the second glass block 470, in some embodiments, forms an outward facing side of the second gapless optical mode converter 400. In some embodiments, the second side of the second glass block 470 is flush with face of the bottom holder 450, while in other embodiments the second side of the second glass block 470 protrudes outward from the second gapless optical mode converter 400 beyond the face of the bottom holder 450. The second glass block 470 is configured to form a path for the manipulated optical light to pass from the lens 430 to a device adjacent to the second glass block 470 and the second gapless optical mode converter 400 (e.g., such as the SOI waveguide 120, discussed above). In some embodiments, a length of the second glass block 470 is less than about 20 mm, less than about 10 mm, or less than about 5 mm, and particular dimensions of the second glass block 470 are not limited herein. Additionally, a particular width of the second glass block 470 may be a matter of design choice which is not limited herein. Furthermore, a size of the second glass block 470 may be based, at least in part, on a size of the first glass block 420 and/or the lens 430 (e.g., such that the second glass block 470 is about ¾, about ½, about ¼, or any other suitable fraction or ratio of the size of the first glass block 420 and/or the lens 430). The second glass block 470 comprises a glass or other substantially clear or light-transmissive material that has a low refractive index to enable the manipulated optical light to pass through the second glass block 470 from the lens 430 with minimal or no effect on the optical light (e.g., the second glass block 470 comprises a material that has a low refractive index and/or low dispersion). For example, in various embodiments the second glass block 470 may comprise crown glass, borosilicate glass, or any other suitable glass or non-glass material that enables the manipulated optical light to pass through the second glass block 470 from the lens 430 with minimal or no effect on the manipulated optical light.

Figure 6:
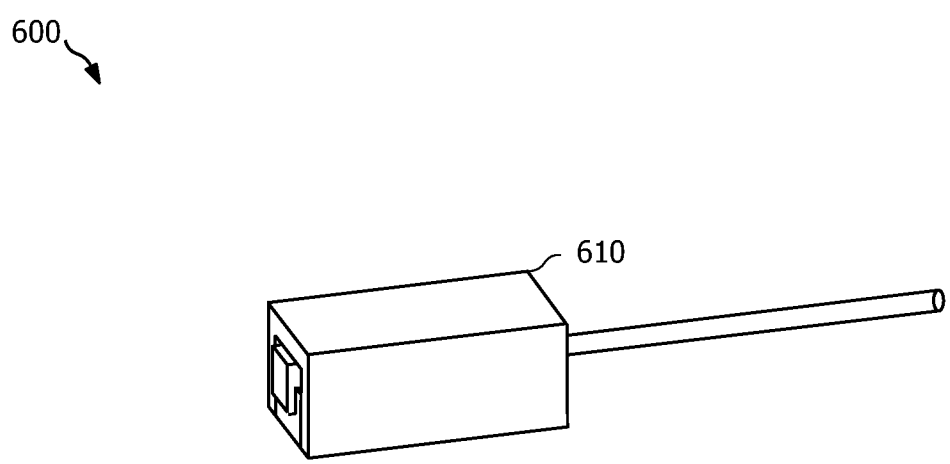
FIG. 6 is a block diagram of a perspective view of an embodiment of a covered gapless optical mode converter.

Referring now to FIG. 6 a perspective view of an embodiment of a covered gapless optical mode converter 600 is shown. The covered gapless optical mode converter 600, in some embodiments, is suitable for implementation as the gapless optical mode converter 130 shown in FIG. 1 and may be substantially similar to the first gapless optical mode converter 200 and/or the second gapless optical mode converter 400 and may include a cover 610. The cover 610 is configured to cover components of the covered gapless optical mode converter 600 to protect the components of the covered gapless optical mode converter 600 from air and/or foreign particles (e.g., dust, moisture, and/or any other substance, organism, or element that by its presence may reduce a level of performance of the covered gapless optical mode converter 600 when compared to a performance of the covered gapless optical mode converter 600 when the substance, organism, or element is not present).

The cover 610 comprises, in some embodiments, a glass substance. For example, the cover 610 may comprise crown glass, borosilicate glass, or any other suitable glass or non-glass material. In some embodiments, the cover 610 is a u-shaped channel having a width sufficient to cover components of the covered gapless optical mode converter 600 and mate with an upper surface of walls of a bottom holder of the covered gapless optical mode converter 600. In other embodiments, the cover 610 is a u-shaped channel having a width sufficient to cover components of the covered gapless optical mode converter 600 and walls of a bottom holder of the covered gapless optical mode converter 600 such that walls of the cover 610 may be substantially flush with a bottom surface of the covered gapless optical mode converter 600, as shown in FIG. 6. As such, particular dimensions of the cover 610 are not limited herein, but may be a matter of design choice based on a desired overall size of the covered gapless optical mode converter 600, a size of the individual components of the covered gapless optical mode converter 600, and/or a desired form of mating or coupling the cover 610 to the individual components of the covered gapless optical mode converter 600. The cover 610 is coupled to any one or more of the individual components of the covered gapless optical mode converter 600, for example, through use of an optical adhesive such that the cover 610 protects the individual components of the covered gapless optical mode converter 600 from air and/or foreign particles, as discussed above. The cover 610, in some embodiments, enables the covered gapless optical mode converter 600 to operate in a non-hermetic environment (e.g., in a component packaging that is not hermetically sealed) while providing a level of performance of the covered gapless optical mode converter 600 comparable to, or greater than, that of an optical mode converter operating in a hermetic environment.

Figure 7:
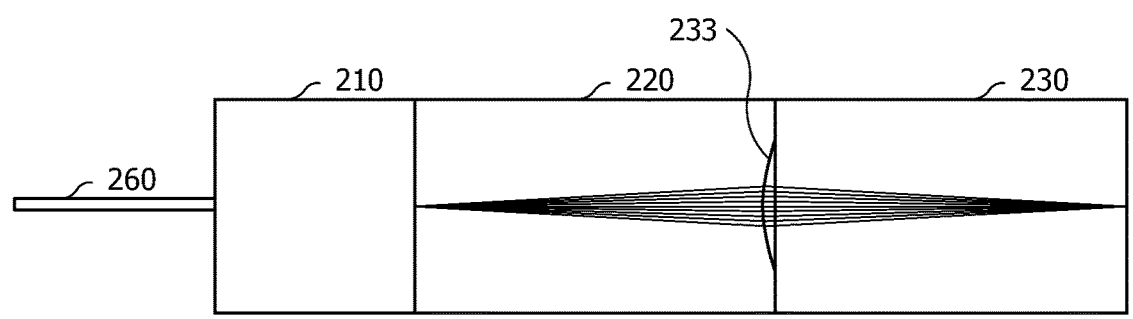
FIG. 7 is an illustration of an embodiment of a light path of an optical light passing through the first gapless optical mode converter.

Referring now to FIG. 7, an illustration of an embodiment of a light path of an optical light passing through the first gapless optical mode converter 200 is shown. The optical light is received by the first glass block 220 from the optical transmission line 260 held by the fiber holder 210. The optical light passes through the first glass block 220 and may refract in the first glass block 220, spreading out as it nears the lens 230. The lens 230 performs mode conversion (e.g., by reducing a mode of the optical light as it passes through the lens 230) and passes the light to a device (not shown) adjacent to the first gapless optical mode converter 200 (e.g., the SOI waveguide 120, discussed above). As shown in FIG. 7, the lens 230 may have a convex surface 233 on at least a portion of a side facing the first glass block 220 such that the lens 230 refocuses the optical light that was refracted while passing through the first glass block 220. Likewise, the first glass block 220 may include a corresponding depression or hollow (e.g., a concave surface) that receives at least a portion of the convex surface 233 of the lens 230.

Figure 8:
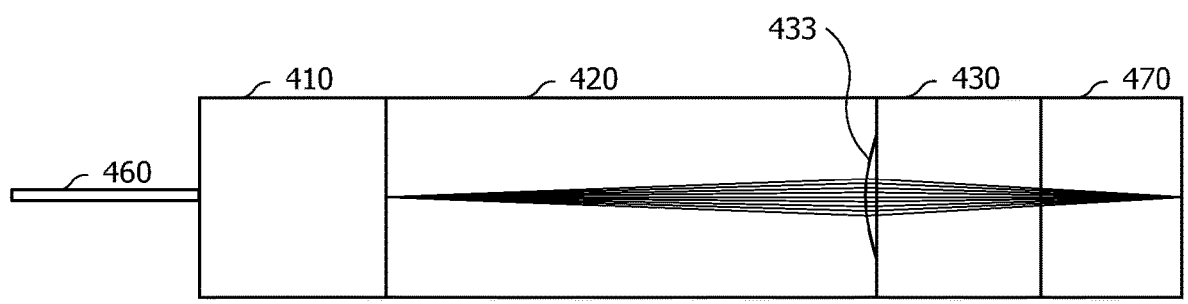
FIG. 8 is an illustration of an embodiment of a light path of an optical light passing through the second gapless optical mode converter.

Referring now to FIG. 8, an illustration of an embodiment of a light path of an optical light passing through the second gapless optical mode converter 400 is shown. The optical light is received by the first glass block 420 from the optical transmission line 460 held by the fiber holder 410. The optical light passes through the first glass block 420 and may refract in the first glass block 420, spreading out as it nears the lens 430. The lens 430 performs mode conversion (e.g., by reducing a mode of the optical light as it passes through the lens 430) and passes the light to the second glass block 470. As shown in FIG. 8, the lens 430 may have a convex surface 433 on at least a portion of a side facing the first glass block 420 such that the lens 430 refocuses the optical light that was refracted while passing through the first glass block 420. Likewise, the first glass block 420 may include a corresponding depression or hollow (e.g., a concave surface) that receives at least a portion of the convex surface 433 of the lens 430. The second glass block 470 passes the optical light to a device (not shown) adjacent to the second gapless optical mode converter 400 (e.g., the SOI waveguide 120, discussed above). As shown in FIG. 8, when a lens 430 having a length (e.g., a thickness) less than that of the lens 230, shown in FIG. 7, is utilized, the second gapless optical mode converter 400 may include the second glass block 470 to provide a greater distance for the optical light to be refocused after passing through the lens 430 and prior to the optical light being passed to the device adjacent to the second gapless optical mode converter 400.

Figure 9:
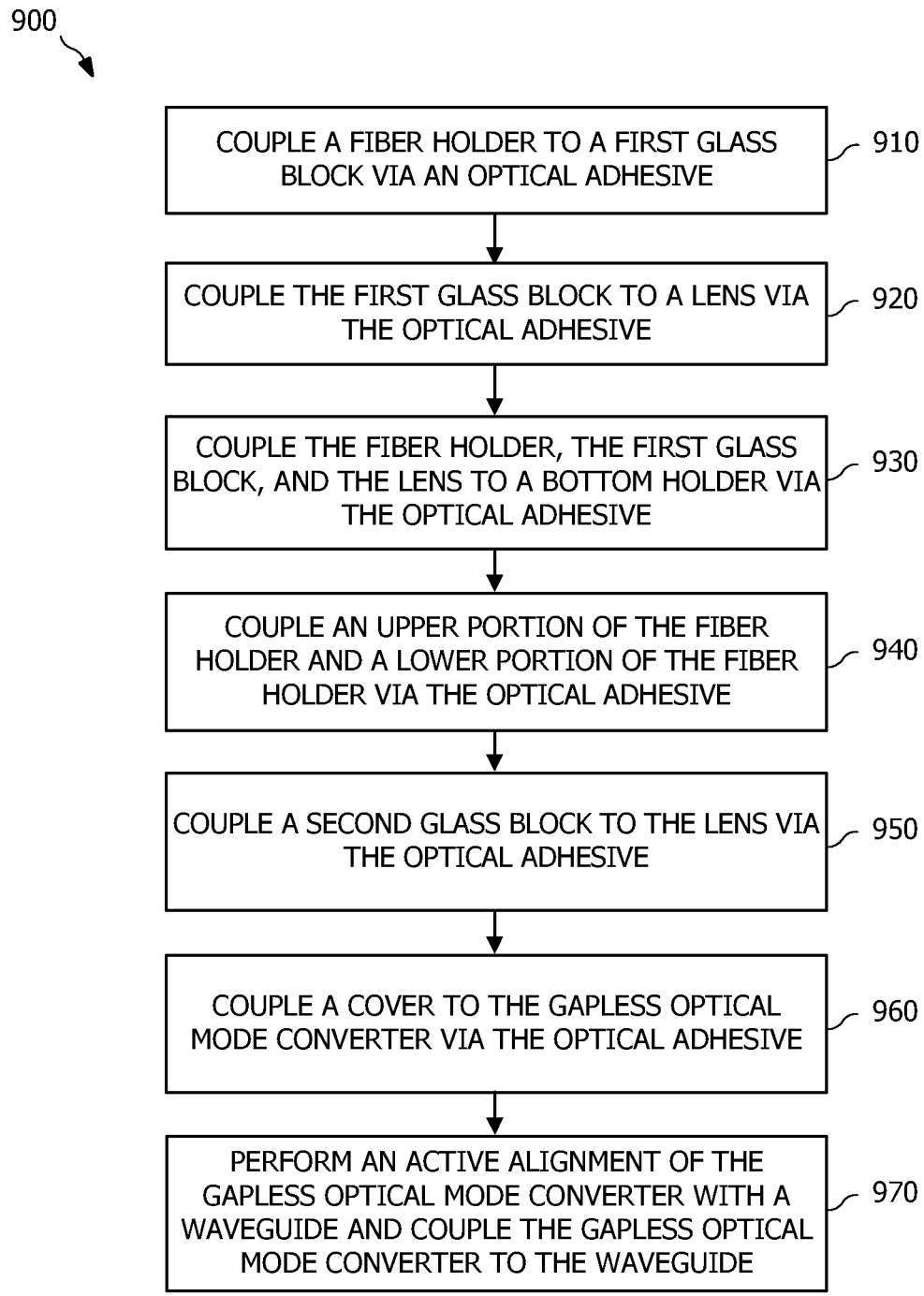
FIG. 9 is a flowchart of an embodiment of a method for manufacturing a gapless optical mode converter.

Referring now to FIG. 9, a flowchart of an embodiment of a method 900 of manufacturing a gapless optical mode converter is shown. The method 900 may be implemented by a manufacturer when a gapless optical mode converter (e.g., the first gapless optical mode converter 200, the second gapless optical mode converter 400, and/or the covered gapless optical mode converter 600) is in a process of being manufactured. At step 910, a fiber holder is coupled to a first glass block via an optical adhesive. The fiber holder, in some embodiments, is substantially similar to the fiber holder 210 and/or the fiber holder 410, discussed above. The first glass block, in some embodiments, is substantially similar to the first glass block 220 and/or the first glass block 420, discussed above. The optical adhesive is an optically transparent material, such as an epoxy resin, that has no or minimal effect on optical light passing through the optical adhesive.

At step 920, the first glass block is coupled to a lens via the optical adhesive. The lens, in some embodiments, is substantially similar to the lens 230 and/or the lens 430, discussed above. The lens is coupled to the first glass block on a side of the first glass block that opposes a side of the first glass block to which the fiber holder was coupled at step 910. At step 930, the fiber holder, the first glass block, and the lens are coupled to a bottom holder via the optical adhesive. The bottom holder, in some embodiments, is substantially similar to the bottom holder 250 and/or the bottom holder 450, discussed above.

In some embodiments, at step 940, an upper portion of the fiber holder and a bottom potion of the fiber holder are coupled together via the optical adhesive. For example, in some embodiments the step 940 may be performed before the step 910, while in other embodiments it may be performed after the step 910. The upper portion of the fiber holder, in some embodiments, may be substantially similar to the upper portion 212 and/or the upper portion 412, discussed above, and the lower portion of the fiber holder, in some embodiments, may be substantially similar to the lower portion 214 and/or the lower portion 414, discussed above. In some embodiments, an optical transmission line (e.g., the optical transmission line 260 or 460) may be placed between the upper and lower portion prior to step 940 such that coupling the upper portion of the fiber holder and the lower portion of the fiber holder secures and holds the optical transmission line between the upper portion of the fiber holder and the lower portion of the fiber holder.

In some embodiments, at step 950, a second glass block is coupled to the lens via the optical adhesive. The second glass block, in some embodiments, is substantially similar to the second glass block 470, discussed above. The second glass block is coupled to the lens on a side of the lens that opposes a side of the lens to which the first glass block was coupled at step 920.

In some embodiments, at step 960, a cover is coupled to the gapless optical mode converter via the optical adhesive. The cover, in some embodiments, may be substantially similar to the cover 610, discussed above The cover may cover all, or only part, of the gapless optical mode converter and may couple to only the bottom holder, or may couple to the bottom holder and one or more of the fiber holder, first glass block, lens, or second glass block.

In some embodiments, at step 970, an active alignment of the gapless optical mode converter with a waveguide is performed and the gapless optical mode converter is coupled to the waveguide via the optical adhesive. The waveguide, in some embodiments, may be substantially similar to the SOI waveguide 120, discussed above. The active alignment is performed by placing the gapless optical mode converter adjacent to the waveguide, transmitting an optical light through the gapless optical mode converter, measuring a response of the waveguide to the optical light, and modifying a position of the gapless optical mode converter with respect to the waveguide until the measured response reaches a desired (e.g., predetermined) threshold.

It should be noted that while the steps of the method 900 are numbered sequentially for ease of description, they are not so limited. Any one or more of the steps of the method 900 may be omitted and/or performed in an order other than the order of discussion of the steps of the method 900 as presented herein and illustrated in FIG. 9.

Figure 10:
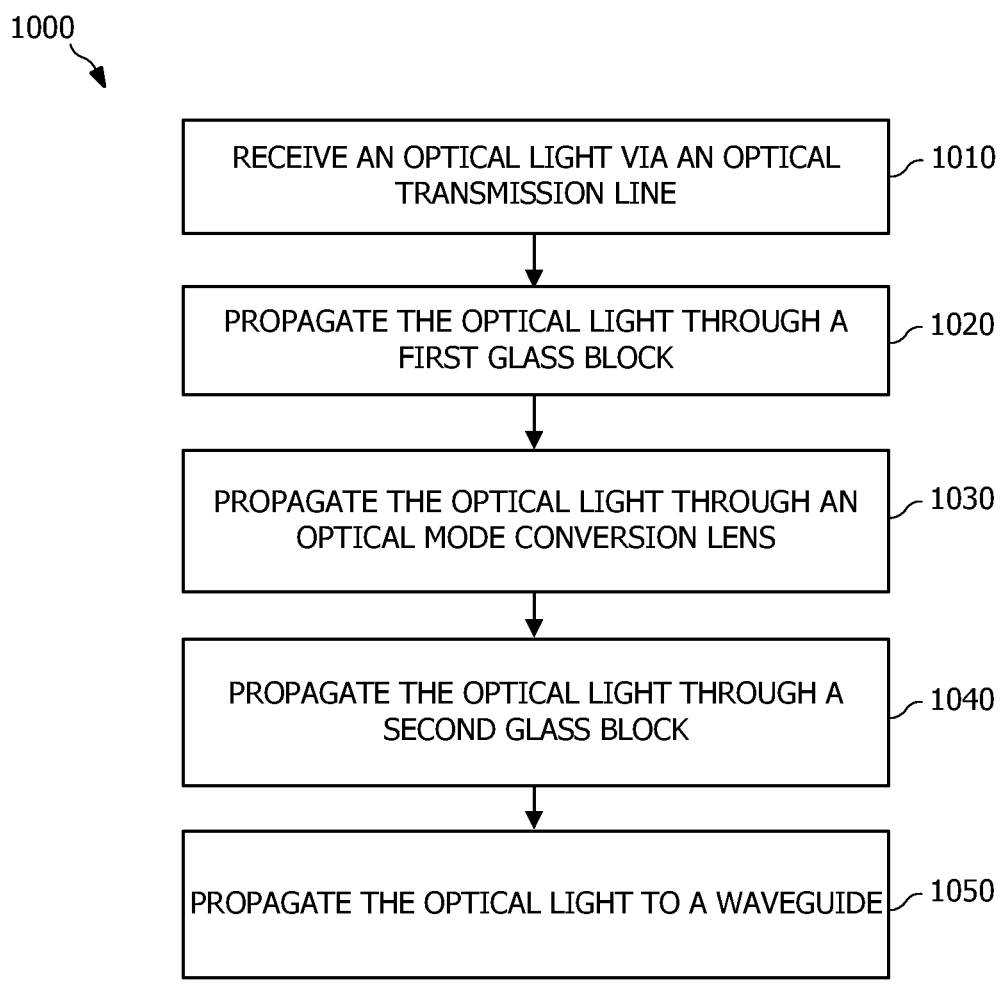
FIG. 10 is a flowchart of an embodiment of a method for implementing a gapless optical mode converter.

Referring now to FIG. 10, a flowchart of an embodiment of a method 1000 for implementing a gapless optical mode converter is shown. The method 1000 is implemented, in some embodiments, when an optical light is converted from a first mode (e.g., size) to a second mode. The gapless optical mode converter is any one of the gapless optical mode converter 200, the gapless optical mode converter 400, or the covered gapless optical mode converter 600. The gapless optical mode converter is implemented, in some embodiments, in a TOSA such as the TOSA 100, discussed above.

At step 1010, the gapless optical mode converter receives an optical light via an optical transmission line (e.g., the optical transmission line 260 or 460, discussed above) coupled to the gapless optical mode converter, for example, via a fiber holder such as the fiber holder 210 or 410, discussed above. The optical transmission line may be any medium suitable for transmitting optical light and is not limited herein. At step 1020, the optical light is propagated through a first glass block (e.g., the first glass block 220 or 420, discussed above). The first glass block, in some embodiments, is coupled to the optical transmission medium and/or the fiber holder via an optical adhesive (e.g., an epoxy resin), as discussed above. At step 1030, the optical light is propagated through an optical mode conversion lens. The optical mode conversion lens, in some embodiments, is coupled to the first glass block via the optical adhesive. Propagating the optical light through the optical mode conversion lens, in some embodiments, converts a mode of the optical light (e.g., decreases or increases the mode of the optical light). The optical mode conversion lens, in some embodiments, is a silicon lens, and in some embodiments is substantially similar to the lens 230 or 430, discussed above. In some embodiments, at step 1040 the optical light is propagated through a second glass block (e.g., the second glass block 470, discussed above). The second glass block, in some embodiments, is coupled to the optical mode conversion lens via the second adhesive. At step 1050, the optical light is propagated to a waveguide (e.g., the waveguide 120 of the TOSA 100, discussed above). The waveguide, in some embodiments, is coupled to the gapless optical mode converter via the optical adhesive. For example, the waveguide is coupled via the optical adhesive to at least one of the optical mode conversion lens or the second glass block.

It should be noted that while the steps of the method 1000 are numbered sequentially for ease of description, they are not so limited. Any one or more of the steps of the method 1000 may be omitted and/or performed in an order other than the order of discussion of the steps of the method 1000 as presented herein and illustrated in FIG. 10.

Disclosed herein is a gapless optical mode converter that enables a package in which the gapless optical mode converter is implemented to be sealed in a non-hermetic manner. The gapless optical mode converter includes means for securing an optical transmission line in a fiber holder, means for coupling a fiber holder to a first glass block, means for coupling the first glass block to a lens to convert an optical mode of an optical light, means for coupling the lens to a second glass block, and means for coupling the gapless optical mode converter to a waveguide.

Additional embodiments are cited in the following clauses.

Clause 1. A gapless optical mode converter comprising:
a fiber holder configured to receive and hold an optical transmission line;
a first glass block coupled via an optical adhesive at a first side to the fiber holder;
a lens coupled via the optical adhesive at a first side to a second side of the first glass block; and
a holder configured to hold the fiber holder, the first glass block, and the lens.

Clause 2. The gapless optical mode converter of claim 1, further comprising a second glass block coupled at a first side to a second side of the lens, wherein the holder is further configured to hold the second glass block.

Clause 3. The gapless optical mode converter of any of clauses 1-2, wherein at least one of the first glass block and the second glass block comprises a borosilicate glass.

Clause 4. The gapless optical mode converter of any of clauses 1-3, wherein the borosilicate glass is a crown glass.

Clause 5. The gapless optical mode converter of any of clauses 1-4, wherein the fiber holder comprises an upper portion and a lower portion, wherein the upper portion and the lower portion each comprise a groove, and wherein the upper portion and the lower portion together are configured to receive and hold the optical transmission line via the groove.

Clause 6. The gapless optical mode converter of any of clauses 1-5, wherein the optical adhesive is an epoxy resin.

Clause 7. The gapless optical mode converter of any of clauses 1-6, further comprising a cover configured to at least partially cover the fiber holder, the first glass block, and the lens.

Clause 8. The gapless optical mode converter of any of clauses 1-7, wherein the lens is a silicon lens, and wherein the lens is configured to reduce a mode of an optical light passed to the lens from the optical transmission line via the first glass block.

Clause 9. A TOSA comprising:
a substrate;
a SOI waveguide coupled to the substrate; and
a gapless optical mode converter coupled via an optical adhesive to the SOI waveguide and comprising:
a fiber holder configured to receive and hold an optical transmission line;
a first glass block coupled via the optical adhesive at a first side to the fiber holder; and
a lens coupled via the optical adhesive at a first side to a second side of the first glass block.

Clause 10. The TOSA of clause 9, wherein the gapless optical mode converter further comprises a second glass block coupled at a first side to a second side of the lens.

Clause 11. The TOSA of any of clauses 9-10, wherein the gapless optical mode converter further comprises a holder configured to hold at least some of the fiber holder, the first glass block, the lens, and the second glass block.

Clause 12. The TOSA of any of clauses 9-11, wherein the first glass block is a borosilicate glass.

Clause 13. The TOSA of any of clauses 9-12, wherein the gapless optical mode converter further comprises a cover configured to cover at least a portion of the gapless optical mode converter.

Clause 14. The TOSA of any of clauses 9-13, wherein the optical adhesive is an epoxy resin.

Clause 15. The TOSA of any of clauses 9-14, wherein a position of the gapless optical mode converter with respect to the SOI waveguide is determines according to an active alignment of the gapless optical mode converter.

Clause 16. A method of manufacturing a gapless optical mode converter, comprising:
coupling a fiber holder to a first glass block via an optical adhesive;
coupling the first glass block to a lens via the optical adhesive; and
coupling the fiber holder, the first glass block, and the lens to a bottom holder via the optical adhesive.

Clause 17. The method of clause 16, further comprising coupling an upper portion of the fiber holder to a lower portion of the fiber holder via the optical adhesive to hold an optical transmission line within the fiber holder.

Clause 18. The method of any of clauses 16-17, further comprising coupling a second glass block to the lens via the optical adhesive.

Clause 19. The method of any of clauses 16-18, further comprising coupling a cover to the gapless optical mode converter via the optical adhesive.

Clause 20. The method of any of clauses 16-19, further comprising:
performing an active alignment of the gapless optical mode converter with a waveguide and;
coupling the gapless optical mode converter to the waveguide via the optical adhesive.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

The use of the term "about" in the present disclosure means a range including ±10% of the subsequent number, unless otherwise stated. In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A gapless optical mode converter comprising:
a fiber holder configured to receive and hold an optical fiber of an optical transmission line;

a first glass block having a first side opposing a second side, the first side coupled to the fiber holder by an optical adhesive;

a lens coupled by the optical adhesive to the second side of the first glass block, wherein the lens reduces a mode of an optical light conveyed over the optical fiber and passed through the first glass block; and a holder that secures the fiber holder, the first glass block, and the lens.

2. The gapless optical mode converter of claim 1, further comprising a second glass block coupled to a side of the lens opposing the first glass block, wherein the holder is further configured to hold the second glass block.

3. The gapless optical mode converter of claim 2, wherein at least one of the first glass block and the second glass block comprises a borosilicate glass.

4. The gapless optical mode converter of claim 3, wherein the borosilicate glass is a crown glass.

5. The gapless optical mode converter of claim 1, wherein the fiber holder comprises an upper portion and a lower portion, wherein the upper portion and the lower portion each comprise a groove, and wherein the upper portion and the lower portion together are configured to receive and hold the optical fiber of the optical transmission line within the groove.

6. The gapless optical mode converter of claim 1, wherein the optical adhesive is an epoxy resin.

7. The gapless optical mode converter of claim 1, further comprising a cover configured to at least partially cover the fiber holder, the first glass block, and the lens.

8. The gapless optical mode converter of claim 1, wherein the lens is a silicon lens.

\* \* \* \* \*